No. 644,978. Patented Mar. 6, 1900.
G. B. GREASER.
VEGETABLE CUTTER.
(Application filed July 14, 1897.)
(No Model.) 2 Sheets—Sheet 1.
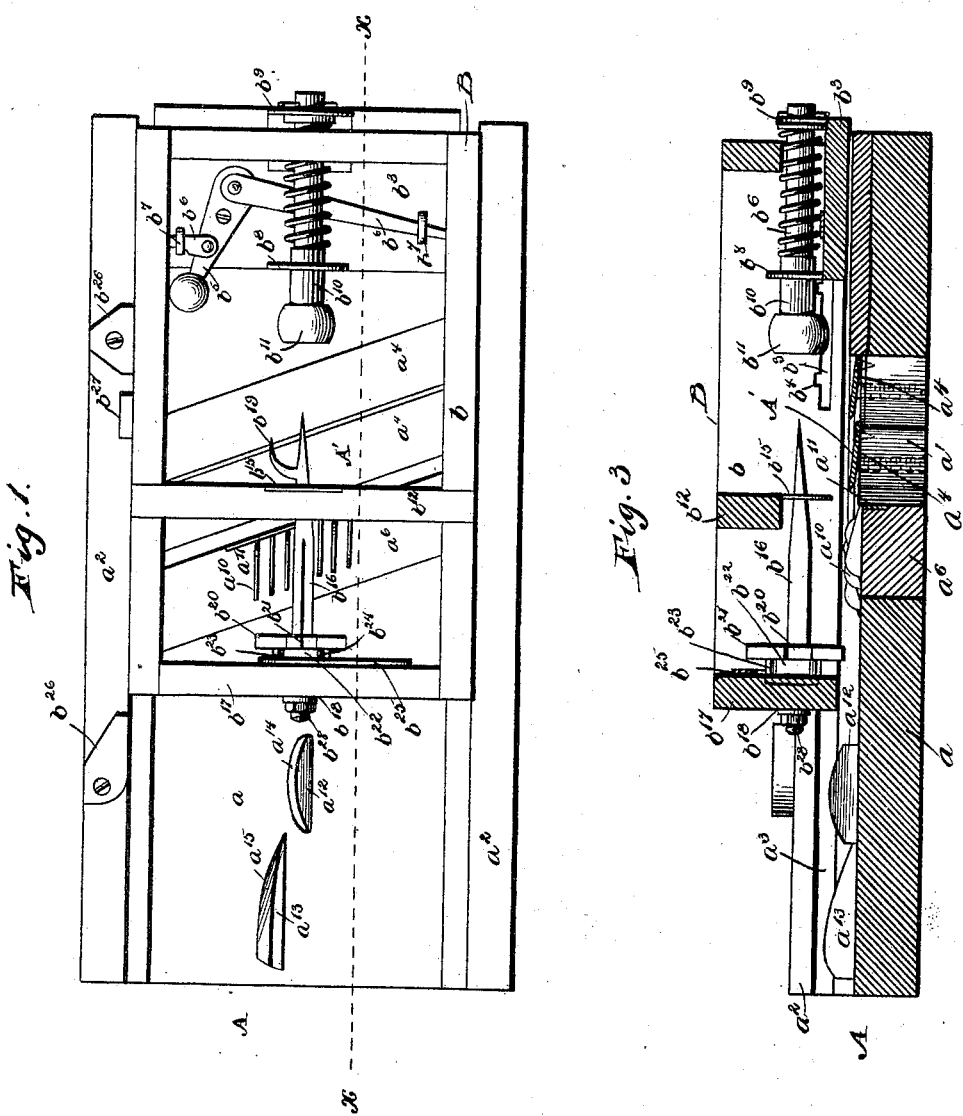
Witnesses
O. Bradway,
Victor J. Evans
Inventor
George B. Greaser.
by John Wedderburn
Attorney
THE NORRIS PETERS CO., PHOTO-LITHO., WASHINGTON, D. C.

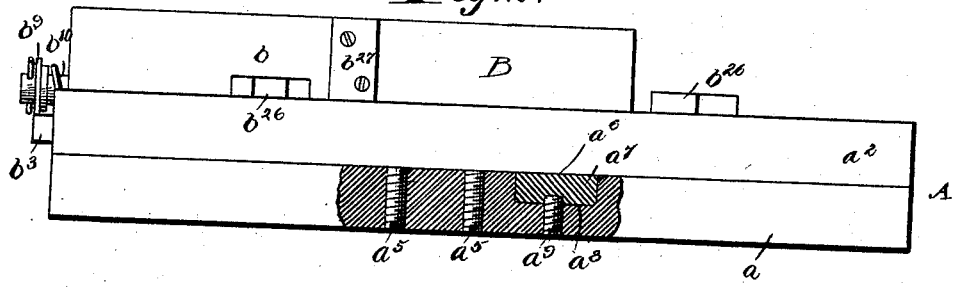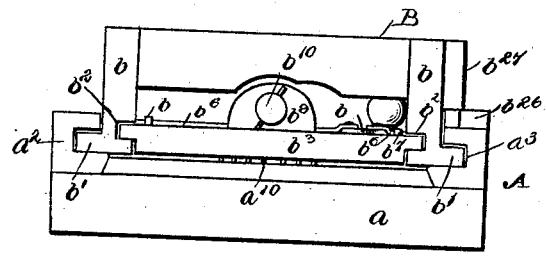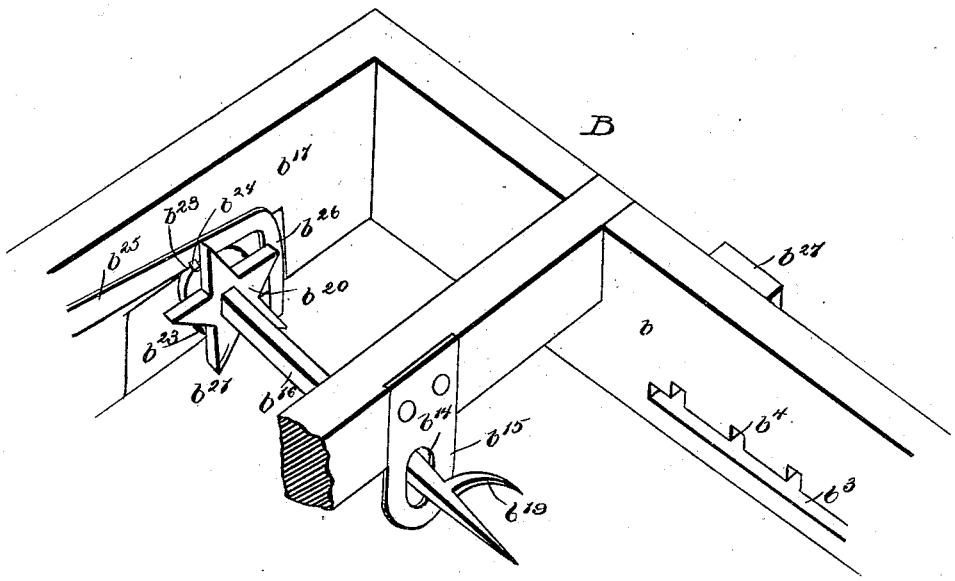

UNITED STATES PATENT OFFICE.

GEORGE B. GREASER, OF DRAB, PENNSYLVANIA.

VEGETABLE-CUTTER.

SPECIFICATION forming part of Letters Patent No. 644,978, dated March 6, 1900.

Application filed July 14, 1897. Serial No. 644,554. (No model.)

*To all whom it may concern:*

Be it known that I, GEORGE B. GREASER, of Drab, in the county of Blair and State of Pennsylvania, have invented certain new and useful Improvements in Vegetable-Cutters; and I do hereby declare the following to be a full, clear, and exact description of the invention, such as will enable others skilled in the art to which it appertains to make and use the same.

My invention relates to a machine for cutting corn, kraut, and other vegetables.

One object of the present invention is to provide a structure by which corn and similar vegetables can be scored and sliced from the ear, while by a slight change the machine can be used for slicing other vegetables.

A further object is to improve generally upon devices of this character.

The invention therefore consists in the various matters hereinafter described and claimed.

In the accompanying drawings, which illustrate my invention, Figure 1 is a top plan view. Fig. 2 is a side elevation, partly in section. Fig. 3 is a longitudinal sectional elevation taken on the line $xx$ of Fig. 1; Fig. 4, an end elevation; and Fig. 5 is a detail of the mechanism upon the corn-holding member for rotating the same.

Referring now more particularly to the drawings, A represents the base of the present machine, this base comprising a bottom plate $a$, a portion of which is cut away, as at $a'$, to accommodate the slicing and cutting members A'. Upon the edges of the base-plate $a$ are erected side pieces $a^2$, which are provided with grooves $a^3$, adapted to act as guides for a reciprocating frame. This frame B is of a generally-rectangular shape and is provided upon its sides $b$ with tenons $b'$, which enter the grooves $a^3$. The corn or other vegetable being suitably held in this cutting-frame, reciprocation of the same above the slicing and scoring mechanism A' will serve to desiccate the article.

The cutting mechanism comprises a series of knives $a^4$, extending across the opening $a'$ in the bottom plate of the machine, these knives resting upon a series of shoulders, so that each knife lies in a different plane. Suitable set-screws, as $a^5$, passing through the base-plate serve to raise and lower the knives, thus regulating the distance between them, and consequently the width of the cut. The scoring member comprises a block $a^6$, which fits one end of the opening $a'$ and has ears $a^7$ projecting from its upper surface, which ears rest upon the shoulders $a^8$ of the base-plate. Suitable set-screws $a^9$ are also provided for raising and lowering the block. Scorers $a^{10}$ are set in this block and are firmly retained in place by means of a metallic plate $a^{11}$, fastened upon the block in rear of the scorers.

Returning now to the reciprocating frame, it will be seen that in one end of the sides thereof grooves $b^2$ are provided, in which grooves slides a block $b^3$, the member for holding one end of an ear of corn or similar vegetable being carried by this block. Suitable stops, such as notches $b^4$, are also provided in the sides of this frame along the grooves, and a lever $b^5$, pivoted upon the block $b^3$, has pivoted upon each side of its own pivot arms $b^6$, adapted to enter the notches $b^4$ and to be withdrawn therefrom upon suitable movement of the lever $b^5$. Guides $b^7$ are secured upon the block and serve to impart the proper direction to the movement of the arms $b^6$. In this manner the block can be adjusted to accommodate ears of different lengths. Brackets $b^8$ and $b^9$ are secured upon the block $b^3$, and a plunger $b^{10}$ is seated in these brackets. The forward end of the plunger—i. e., that end toward the hereinafter-described coacting member for supporting the corn—is provided with a cup-shaped depression or socket $b^{11}$, adapted to receive one end of the corn-ear. A coiled spring $b^{12}$ is arranged upon the stem of this plunger in a well-known manner, the function of the spring being to hold the plunger firmly against the cob. The plunger is free to rotate in its brackets for a purpose which will be fully understood after the description of the other mechanism of the machine.

A cross-bar $b^{12}$ extends between the sides of the cutting-frame, and in an elongated slot $b^{14}$ in a bracket $b^{15}$, carried by this cross-bar, is seated a shaft $b^{16}$, this shaft being further journaled through the end piece $b^{17}$ of the frame, as at $b^{18}$. As shown, the shaft is provided with a shoulder which revolves against a metallic plate upon the inner side of the end piece. The end of this shaft lying toward the before-mentioned plunger is sharpened and in combination with a second point $b^{19}$, extending from the side of the shaft and projecting substantially parallel with the same, forms a fork adapted to be inserted in the end of a corncob. It will thus be apparent that a cob can be fastened between the fork and the plunger and reciprocated with the frame, while any rotation given the fork-carrying shaft will serve to impart a corresponding motion to the corncob. The shaft and plunger are of course so placed that the cob is, in the reciprocation of the frame, carried across the scorers and the cutting-knives.

The mechanism for rotating the shaft, and consequently the corncob, will now be described. Upon the shaft $b^{16}$ is firmly secured a plate $b^{20}$, having a suitable number of points $b^{21}$ projecting therefrom, this plate being here shown in the form of a star. There is also a circular plate $b^{22}$ keyed or otherwise fixedly secured upon the shaft $b^{16}$, this plate being provided with notches $b^{23}$, adapted to receive a lug $b^{24}$ upon a lever $b^{25}$, pivoted upon the end piece of the frame. Upon the base-plate $a$ are located two cams $a^{12}$ and $a^{13}$, the function of which is to suitably engage the star-shaped plate upon the shaft, and thus impart the required rotation. It will be noticed that one of these cams $a^{12}$ lies in substantially the vertical place which includes the shaft; but one of the sides of the cam is curved outwardly, as at $a^{14}$. The second cam, $a^{13}$, lies to that side of the cam $a^{12}$ upon which the curve is formed, said cam $a^{13}$ having its forward end—i. e., the end toward the other cam—inclined, as at $a^{15}$. At this point it should be noticed that the lever $b^{25}$ has a depending arm $b^{26}$, in the path of travel of which the cam $a^{13}$ is located. A suitable space being left between the forward portion of the cam $a^{13}$ and the body portion of the cam $a^{12}$, and the cutting-frame having reached the end of its movement in the operation of cutting, it will be seen that when the reciprocating frame is moved backwardly preparatory to making a second stroke the depending arm $b^{26}$ will ride upon the inclined forward portion of the cam $a^{13}$, thus lifting the lug $b^{25}$ from engagement with the notch upon the circular plate, and following this movement one of the points of the star-shaped plate will ride upon the inclined portion of the cam, thus giving the plate sufficient rotation to bring the next following point of the star-shaped plate in position to enter between the cams in the next forward movement of the reciprocating frame and to be engaged by the cam $a^{12}$ in the continuation of this forward movement, whereby the partial rotation of the cob-carrying shaft is completed, the parts being so arranged that this completion of rotation will be effected and the shaft locked in its new position by means of the lever $b^{24}$ before the cob passes over the scorers. It will at once be seen that in the continued reciprocation of the frame an entire revolution of the shaft will be effected, thus presenting all portions of the cobs to the scorers and cutting-knives.

Suitable stops $b^{26}$ are provided upon one of the side pieces of the base member, and these are adapted to coact with a lug $b^{27}$ upon the reciprocating frame to limit the movement of said frame. One of the stops is pivoted and so constructed that when drawn outwardly it will lie out of the path of the lug $b^{27}$, thus permitting the frame to be removed from the body portion of the machine. The shaft $b^{16}$ is held in place by means of a suitable nut, as $b^{28}$, fitting upon the threaded end of said shaft, and in order to remove the aforementioned member it is only necessary to unscrew the nut, pass the shaft forwardly through the end piece of the reciprocating frame, and then withdraw the fork end of the shaft through the elongated slot in the bracket $b^{15}$. The block $b^3$ can be removed by withdrawing the locking-arms from the notches in the sides of the cutting-frame and passing the block, with its attached members, out of the free end of the grooves $b^2$. After removing the block $b^3$, with its members, (and, if so desired, the shaft $b^{16}$,) the frame can be employed for cutting kraut or any other vegetable. Preferably, however, a plain rectangular frame is substituted for the before-described reciprocating frame when it is desired to cut a vegetable of the nature of kraut, slaw, &c. Of course it has been readily seen that the block carrying the scorers can also be removed from the machine, and, if desired, a plain block can be inserted in its stead. Furthermore, if so desired, the machine can be of sufficient width to accommodate a plurality of plungers and forked shafts, thus increasing the capacity of the machine.

Having thus described my invention, what I claim as new, and desire to secure by Letters Patent, is—

1. In a vegetable-cutter, a reciprocating frame having ways upon its sides, a block upon said ways, a spring-actuated holder upon said block, a second holder upon said cutting-frame, and means for adjusting said block longitudinally in the ways with relation to the second holder, substantially as described.

2. In a vegetable-cutter, a reciprocating frame provided with ways upon its sides, a block having sliding movement in said ways, stops upon the sides along the ways, movable arms upon the block adapted to engage with and be disengaged from the stops, a holder carried by said block, and a second holder carried by the reciprocating frame substantially as described.

3. In a vegetable-cutter, a reciprocating frame, a holder carried by the said frame, a member adjustable with relation to the before-mentioned holder, and a yielding holder upon said adjustable member, the parts being so arranged that the holders will coact; substantially as described.

4. In a vegetable-cutter, the combination of a reciprocating frame, a holder fixed to the frame, a block adjustable in the frame with relation to the holder, brackets upon the block, a plunger-holder seated in the brackets, and a spring for keeping the plunger-holder in operative position.

5. In a vegetable-cutter, the combination of a reciprocating frame, a holder suitably supported upon said frame, grooves in the sides of said cutting-frame, a block slidable in said grooves, notches formed in the sides along the grooves, a lever pivoted to the block, guides upon said block, arms pivoted to the lever and passing through said guides, said arms being adapted to enter and recede from the notches upon appropriate movement of the lever, brackets upon said block, a plunger in said brackets, said plunger having a socket formed in its forward end, and a coiled spring bearing at one end against the plunger and at its other end against one of the brackets, whereby the plunger is normally held in a forward position, the parts being so arranged that the holder and the plunger coöperate to engage and hold an article placed between them; substantially as described.

6. In vegetable-cutters, the combination of a base member having reciprocating mechanism thereon, a cutting-frame reciprocating on said base member, a shaft journaled in said cutting-frame, said shaft being provided with a holder, arms upon said shaft, and cams upon the base member adapted to engage the arms in the reciprocation of the parts and to impart rotation to the shaft; substantially as described.

7. In a vegetable-cutter, the combination of a base member, cutting mechanism attached to said member, a frame reciprocating on said base member, a shaft mounted in the reciprocating frame, the shaft being provided with a holder, arms extending from the shaft, a cam on the base member below the shaft having one of its sides curved outwardly, and a second cam on the base member lying out of the line of the shaft carried by the reciprocating frame and to one side of the first-mentioned cam, the second cam having its forward portion inclined, whereby rotation is imparted to the shaft upon operating the reciprocating frame.

8. In a vegetable-cutting machine of the character indicated, a holder, a reciprocating member, means for reciprocating the holder and cutting member one with relation to the other, means for rotating the holder in the movement of reciprocation, and means for locking said holder in position during the action of the cutting member; substantially as described.

9. A vegetable-cutting machine of the nature indicated, comprising a base member, a reciprocating frame upon said base member, the cutting-frame and base member having reciprocation one with relation to the other, a shaft journaled upon said cutting-frame, said shaft being provided with a holder, a cutting mechanism upon the base member, means for rotating the shaft during the reciprocation of the parts, and means for locking said shaft in position, during the action of the cutting mechanism; substantially as described.

10. A vegetable-cutting machine of the character indicated, comprising a base member, a cutting mechanism upon said base member, a reciprocating frame upon said base member, said frame and base member having reciprocation one upon the other, a shaft journaled upon said frame, said shaft being provided with a holder, a plate upon said shaft, said plate being provided with notches, a locking member upon the cutting-frame adapted to engage with and be disengaged from the notches, and means for releasing the locking member from the notches and permitting rotation of the shaft, before again engaging the locking member with the notches and thus holding the shaft against rotation during the action of the cutting mechanism; substantially as described.

11. A vegetable-cutting machine of the character indicated, comprising a base member, a cutting mechanism upon said base member, a reciprocating frame upon said base member, said cutting-frame and base member having reciprocating movement one upon the other, a shaft journaled upon said cutting-frame, said shaft being provided with a holder, a plate upon said shaft, said plate being provided with notches, a lever upon the reciprocating frame, a lug upon said lever adapted to engage with the notches upon the plate, and means for releasing the lug from a notch to permit rotation of the shaft before again throwing the lug into a notch and thus holding the shaft in a fixed position during the action of the cutting mechanism; substantially as described.

12. A vegetable-cutting machine of the character indicated comprising a base member, a cutting mechanism upon said base member, a reciprocating frame upon said base member, said base member and frame having reciprocation one upon the other, a shaft journaled in said reciprocating frame, said shaft being provided with a holder, a plate having notches therein upon said shaft, a lever upon the reciprocating frame, a lug upon said lever adapted to engage the notches in the plate, an arm upon said lever, and a cam upon the base member in the path of the before-mentioned arm, whereby during the reciprocation of the frame, the lug will be disengaged from its notch in the plate and held from said engagement during rotation of the shaft but will engage a notch after the shaft has been sufficiently rotated; substantially as described.

13. A machine of the character indicated comprising a base member provided with a reciprocating mechanism, a cutting-frame upon said base member, said frame and base member having reciprocation one with relation to the other, a shaft journaled upon said reciprocating frame, said shaft being provided with a holder, arms projecting from said shaft, a plate provided with notches upon said shaft, a lever upon the reciprocating frame, a lug upon said lever adapted to engage with and be disengaged from the notches in the plate, an arm depending from said lever, a cam upon the base-plate in line with the shaft, said cam having one of its sides rounded, and a second cam upon said base-plate out of line with the shaft but in line with the depending arm of the lever, said second cam lying toward the curved side of the first-mentioned cam and having its forward portion inclined; substantially as described.

In testimony whereof I have signed this specification in the presence of two subscribing witnesses.

GEORGE B. GREASER.

Witnesses:
E. B. STONEROOK,
H. D. STONEROOK.